United States Patent
Lee et al.

(10) Patent No.: US 8,422,654 B1
(45) Date of Patent: Apr. 16, 2013

(54) INCREASING THE LIKELIHOOD THAT A CONFERENCE CALL WILL OCCUR

(75) Inventors: Woojae Lee, Manhattan, KS (US); Hannah J. Sifuentes, Raytown, MO (US); Cesar Perez, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 337 days.

(21) Appl. No.: 12/822,347

(22) Filed: Jun. 24, 2010

(51) Int. Cl.
 *H04M 3/42* (2006.01)
(52) U.S. Cl.
 USPC ....... 379/202.01; 370/261; 709/204; 709/227
(58) Field of Classification Search ............ 379/202.01, 379/201.01; 370/261; 709/204, 227
 See application file for complete search history.

(56) References Cited

U.S. PATENT DOCUMENTS

| | | | |
|---|---|---|---|
| 6,751,211 B1 * | 6/2004 | Chack | 370/352 |
| 2009/0323916 A1 * | 12/2009 | O'Sullivan et al. | 379/202.01 |
| 2011/0150201 A1 * | 6/2011 | Haich et al. | 379/202.01 |
| 2011/0268263 A1 * | 11/2011 | Jones et al. | 379/202.01 |

* cited by examiner

*Primary Examiner* — Quynh Nguyen

(57) ABSTRACT

Methods and products are provided for facilitating a conference call. One embodiment includes receiving an incoming call from a participant who is to participate in the conference call but who does not have authority to start the call, identifying a chairperson who does have authority to start the conference call, and automatically notifying the chairperson that the participant is waiting for the conference call to begin.

19 Claims, 7 Drawing Sheets

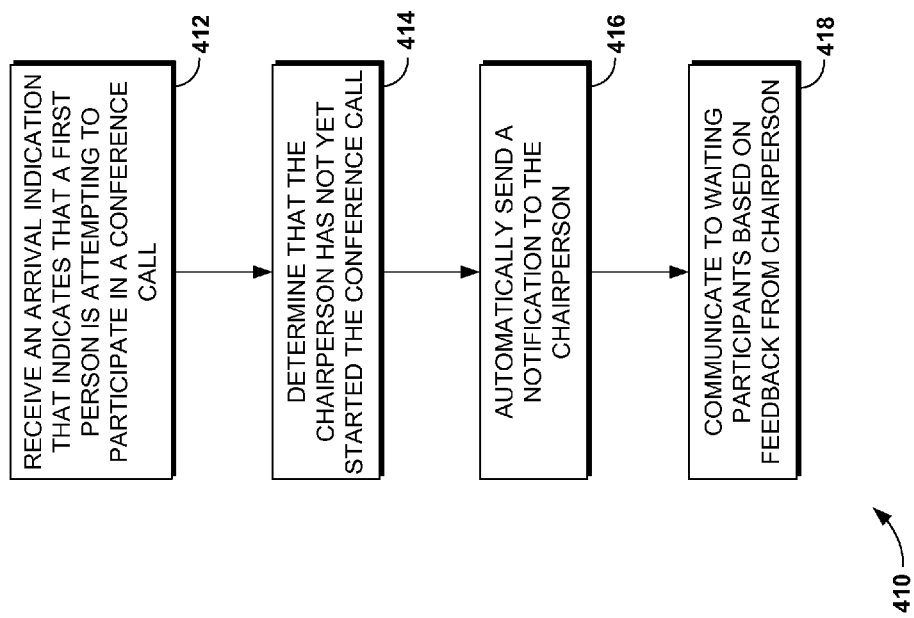

US 8,422,654 B1

INCREASING THE LIKELIHOOD THAT A CONFERENCE CALL WILL OCCUR

SUMMARY

Embodiments of our technology are defined by the claims below, not this summary. A high-level overview of various aspects of our technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways of increasing the likelihood that a conference call will occur. In cases where a conference-call leader has not arrived to open a conference call, he or she will be notified according to a predefined profile and/or based on feedback received from awaiting users/participants.

BRIEF DESCRIPTION OF THE SEVERAL VIEWS OF THE DRAWINGS

Illustrative embodiments of the our technology are described in detail below with reference to the attached drawing figures, wherein:

FIGS. 4-6 are flowcharts of ways of facilitating a conference call according to various embodiments of our technology.

DETAILED DESCRIPTION

Figure 1:
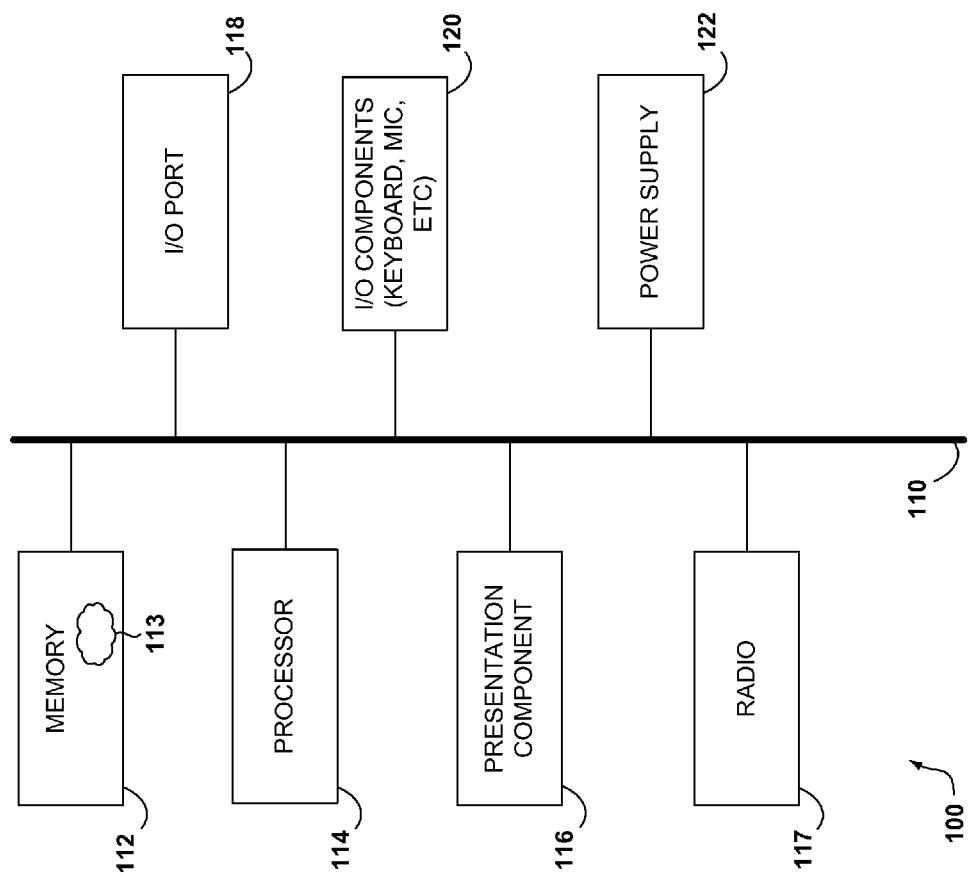
FIG. 1 depicts an exemplary node or call-in device according to one embodiment of our technology.

The subject matter of the present technology is described with specificity herein to meet statutory requirements. However, the description itself is not intended to define the technology, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

| | |
|---|---|
| ASCII | American Standard Code for Information Interchange |
| CDMA | Code Division Multiple Access |
| GIS | Geographic/Geographical/Geospatial Information System |
| GPRS | General Packet Radio Service |
| GSM | Global System for Mobile communications: originally from Groupe Spécial Mobile |
| IM | Instant Messaging |
| IP | Internet Protocol |
| LTE | Long Term Evolution |
| PSTN | Public Switched Telephone Network |
| SMS | Short Message Service |
| TDMA | Time Division Multiple Access |
| UMTS | Universal Mobile Telecommunications System |
| USB | Universal Serial Bus |
| VPN | Virtual Private Network |

Further, various technical terms are used throughout this description. An illustrative resource that fleshes out various aspects of these terms can be found in Newton's Telecom Dictionary, 25th Edition (2009).

Embodiments of our technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, a block diagram of an illustrative computing device is provided and referenced generally by the numeral 100. Although some components are shown in the singular, they may be plural. For example, computing device 100 might include multiple processors or multiple radios, etc. As illustratively shown, computing device 100 includes a bus 110 that directly or indirectly couples various components together including memory 112, a processor 114, a presentation component 116, a radio 117, input/output ports 118, input/output components 120, and a power supply 122.

We have previously described various memory components that memory 112 might take the form of. Thus, we will not elaborate more here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Radio 117, if included, represents a radio that facilitates communication with a wireless telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into computing device 110. Power supply 122 includes items such as batteries, fuel cells, or any other component that can act as a power source to power computing device 100.

One of the benefits of our technology is that it increases the likelihood that a conference call will occur. Sometimes callers phone into a conference call, but the leader has not yet arrived. Various terms are used to describe a "leader," such as moderator, presenter, chairperson, etc. All of these phrases are used variously herein to refer to an indispensible party; namely, one who is responsible for initiating a conference call so that it is opened up to any awaiting participants.

In instances where the chairperson has not yet arrived, people who have called into the conference call must wait for the chairperson to arrive and are afforded no options absent our technology. And if the chairperson never arrives or opens the call, then the conference call never occurs. One aspect of our technology increases the likelihood that a conference call will occur by providing ways to notify the leader that the call should occur. Those of ordinary skill in the art often use the phrase "bridge" to refer to a conference call and a "conference-bridge owner" synonymously with the previously mentioned examples of "leader," "chairperson."

In one embodiment, when a leader registers with a teleconference server (variously referred to as a "conference bridge" or just "bridge"), he or she provides registration information that is stored in connection with the leader. Illustrative examples of such registration information include a chairperson code that is usable to indicate that the person calling in is the chairperson, possibly participant codes that are usable to allow participants to join a call hosted by the chairperson, and contact information.

Illustrative types of contact information include an email address, a pager number, an alternative phone number, a short message service (SMS) identifier, an alias for use in connection with a social-networking site, an instant-messaging (IM) alias, or other contact information that is usable to contact the chairperson either directly or indirectly. Thus, the teleconference server has access to contact information associated with a chairperson. When a participant calls into the teleconference server, it can handle both answering the call and referencing contact information so as to contact the chairperson.

In one embodiment, a person will enter a conference ID, which will be used by the teleconference server to know that the chairperson has not yet arrived. In some embodiments of our technology, options can be provided to one or more of the participants who have called in so that they can derive how the chairperson is contacted. For example, options might be provided so that the chairperson is initially attempted to be reached in a mild manner. But automatically or at a user's request, more aggressive means can be applied to attempt to reach the chairperson.

For example, whereas initially an email might be sent to the chairperson's email address, if a certain amount of time passes from when a given participant either initially phoned in or has been waiting, or after a certain number of participants have joined, more aggressive ways of attempting to contact the chairperson can be used, such as blasting information to one or more devices or accounts associated with the chairperson. For example, several contact attempts might be made in parallel such as phoning the chairperson, emailing the chairperson, sending an automated message to an administrative assistant, initiating a page of the person, sending the person an instant message, updating a person's status on a social-networking site, etc.

As previously mentioned, one embodiment of our technology contemplates participants being able to interact with the system. Options can be provided for them to record a message that is to be conveyed to the chairperson. By way of example, if someone has been waiting for five minutes and has another meeting that he or she must attend, a participant can be promoted to record a message such as "John, I will not be able to make the rest of this call but call me later at such-and-such time." This message can be sent in audio format (such as by way of an attachment via email) or it can be converted from speech to text and conveyed to the chairperson in this manner. As mentioned, various aspects of our technology can either be automated, participant-driven, or a combination of the same.

When a notification is sent to the chairperson, the content of the notification can vary. For example, the notification might include an indication of a number of people who are waiting. In other embodiments, the notification could include an indication of an amount of time that one or more people have been waiting. It could include a cancellation option that, when activated, sends a message to the waiting participants that the meeting will be cancelled. This can either be recorded in real time, conveyed in text in real time, or preconfigured and stored in the user profile that is used whenever the cancellation option is selected.

The notification could also include a start option, which if acted on, would enable the meeting to start immediately. Thus, the chairperson has a means of starting the conference call remotely. When this occurs, the chairperson might not know who is on the call just before the chairperson joins. Thus, in one embodiment of our technology, the announcements of each participant are recorded and then played back to the chairperson privately just before the chairperson joins the call. The notification could also include an acknowledgment option that allows the chairperson to affirmatively acknowledge that he or she has received the notification. This could also be accomplished by replying to the message.

The teleconference server then updates participants in one embodiment of our technology. For example, if the chairperson indicated that she was five minutes away from starting the meeting, then this information is communicated to the awaiting participants. If the chairperson indicated that call should be started immediately, then the teleconference server opens the bridge so that the participants can begin communicating with each other. In other embodiments, participants are updated even though the chairperson does not respond to a notification that the call is to begin. For example, in one embodiment, as soon as the teleconference server sends a notification to the chairperson, that fact itself is communicated to the participants. In this way, the participants know that at least some action has been taken, which discourages them from dropping off the call. This is another way of increasing the likelihood that the conference call will occur.

Figure 2:
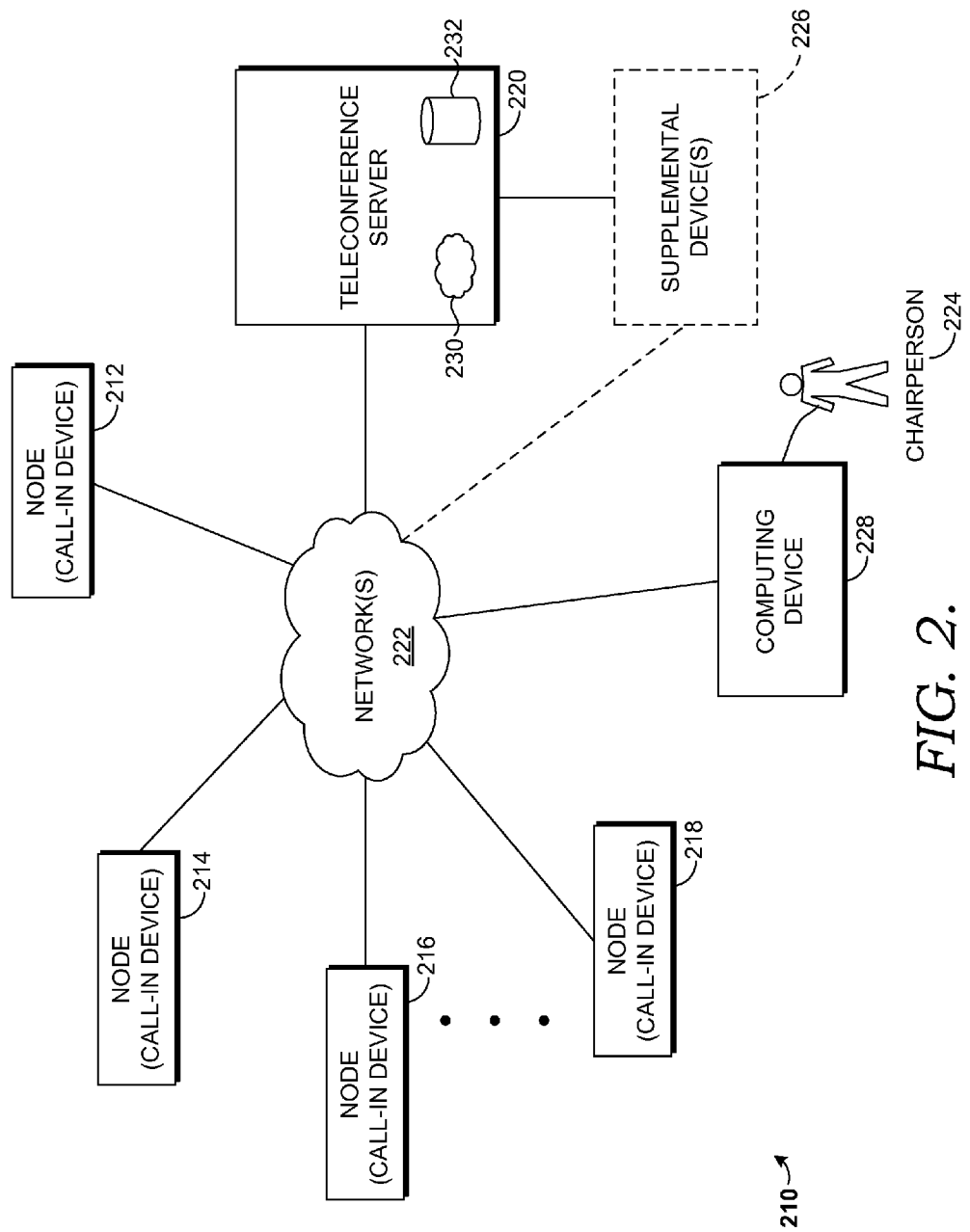
FIG. 2 depicts an illustrative operating environment according to one embodiment of our technology.

Turning now to FIG. 2, an illustrative operating environment for practicing an embodiment of the present invention is provided and referenced generally by the numeral 210. Operating environment 210 includes various nodes or call-in devices 212, 214, 216, and 218. There could be many more call-in devices besides the four that are shown. In one embodiment, a call-in device is similar in form and makeup to the computing device of FIG. 1. A call-in device could be a computer, conventional telephone, handheld mobile device, Smartphone, etc. It can be any device that is usable to communicatively couple itself to teleconference server 220 by way of one or more networks 222.

Network 222 might actually be multiple networks. For example, network 222 represents an ability to communicate via public networks such as the public switched telephone network (PSTN), the Internet, as well as private networks such as intranets and virtual private networks (VPNs).

Teleconference server 220 may take on a variety of names by skilled artisans. As mentioned, teleconference server 220 might be referred to by some as a "bridge." Some might refer to it as a call-in server or some other name. Its purpose is to be able to answer incoming calls from the various nodes and carry out the tasks of receiving information from the participants and facilitate communication with chairperson 224. In some embodiments, teleconference server 220 is multiple devices instead of the singular representation, which is provided for the sake of simplicity. In still other embodiments, one or more supplemental devices 226 work in connection with teleconference server 220 to carry out various functional aspects of the invention.

For example, in one embodiment, teleconference server 220 might take the form of a computer that is coupled to a bridge, which would fall within the scope of what is being referred to as supplemental device 226. We do not mean to necessarily make a stark distinction between chairperson 224 and a computing device 228 with which the chairperson is associated. We show the two separately for pictorial purposes, but when we refer to contacting the chairperson, when it makes sense, we are referring to contacting computing device 228, which is associated with chairperson 224. For example, computing device 228 might be the chairperson's personal computer, mobile phone, PDA, social-networking site, blog site, etc.

In one embodiment, teleconference server 220 includes a set of computer executable instructions 230 that are embodied on one or more memory components of teleconference server 220. The set of executable instructions 230 will be variously referred to herein as "application 230," which might be same or similar to application 113 of FIG. 1. When executed, application 230 carries out some or all of the process steps that will be described in greater detail below. It also has access to registration information 232, which is illustratively shown as being stored in connection with teleconference server 220 but could also be stored separately; for example, on a separate device that is coupled to telecommunication server 220. Registration information 232 maintains information related to chairperson 224.

Illustrative information includes a chairperson identification code, various participant codes, and contact information. As alluded to previously, contact information could include an indication of the chairperson's email address, alternative phone number, IM alias, pager number, a prerecorded message that is sent to an administrative assistant, a set of rules that are to be executed when chairperson 224 is to be contacted, an indication of an alias associated with a social-networking site such as that offered by the Facebook Corporation, or any other information that is to be used in connection with attempting to contact chairperson 224 when he or she is to be contacted.

Although we sometimes use the plural form of words or the singular form of words in this disclosure, we do not mean to implicate a strict sense of singular and plural. Mostly for readability, we speak in the singular, but we clearly do not mean for that to limit the scope of our technology by using such terminology. For example, contact information 232 might include a variety of email addresses, as well as a variety of phone numbers, etc.

Computing device 228 might take the form of the illustrative computing device in FIG. 1, as a node 212, or other device. Again, it can be any number of devices that are usable to communicate with teleconference server 220 by way of network 222.

Figure 3A:
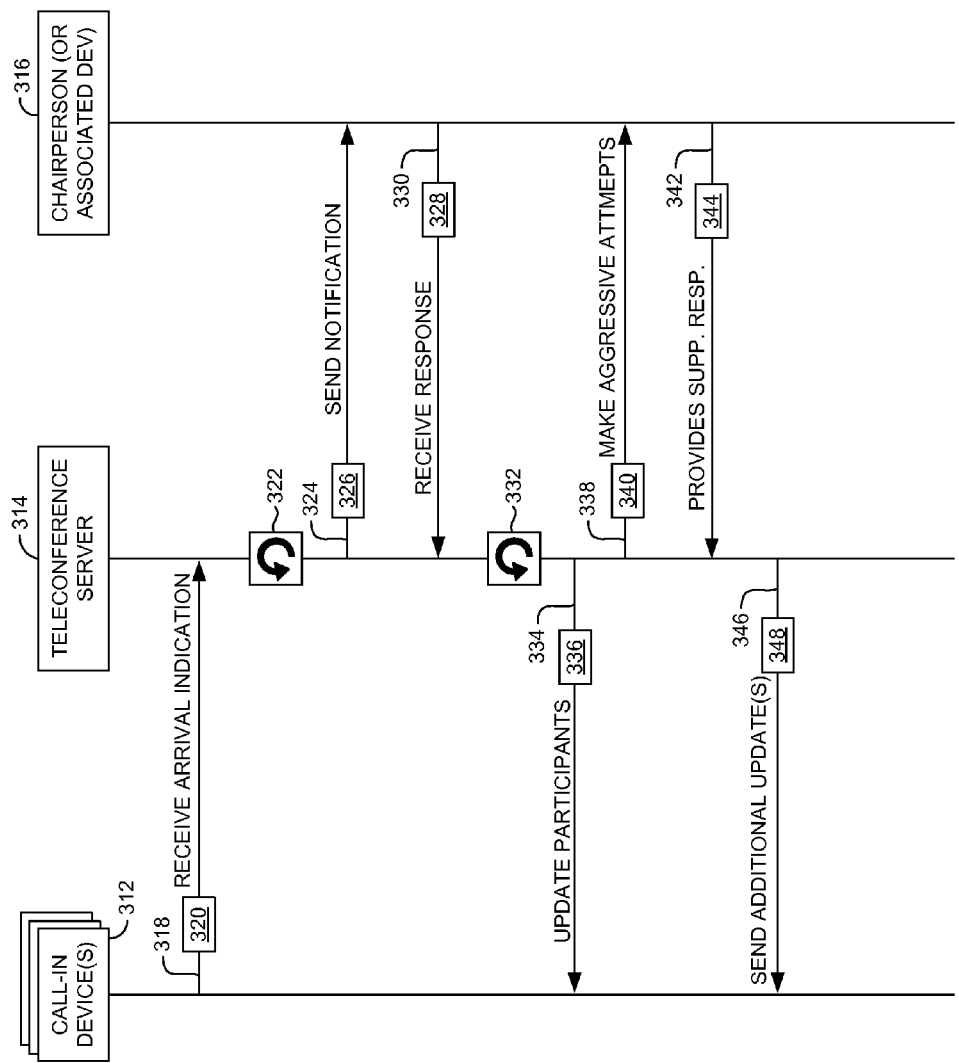
FIG. 3A depicts an illustrative data-flow diagram for facilitating a conference-call opening according to one embodiment of our technology.

Turning now to FIG. 3A, an illustrative method of initiating a conference call according to an embodiment of our technology is provided. FIG. 3A depicts an exemplary call-in device 312, a teleconference server 314, and a chairperson 316 (or device associated therewith), all of which may be similar in nature to types of devices previously described. At step 318, an arrival indication 320 is received by teleconference server 314.

Thus, in one embodiment, one or more persons calls in via call-in device 312 in an attempt to ultimately join a conference call that will be hosted by chairperson 316. In one embodiment, the process begins when teleconference server 314 receives arrival indication 320, which indicates that at least one participant has phoned into the conference call and is waiting for the chairperson to open the bridge. For purposes of this prophetic example, contact information associated with chairperson 316 has been previously stored and is accessible by teleconference server 314. At a step 322, teleconference server 314 references such contact information (e.g., 232) to determine ways and/or procedures to contact chairperson 316. As previously mentioned, perhaps chairperson 316 has indicated that a given email address should be first attempted to be reached, or perhaps an alternative phone number rung, etc.

Figure 3B:
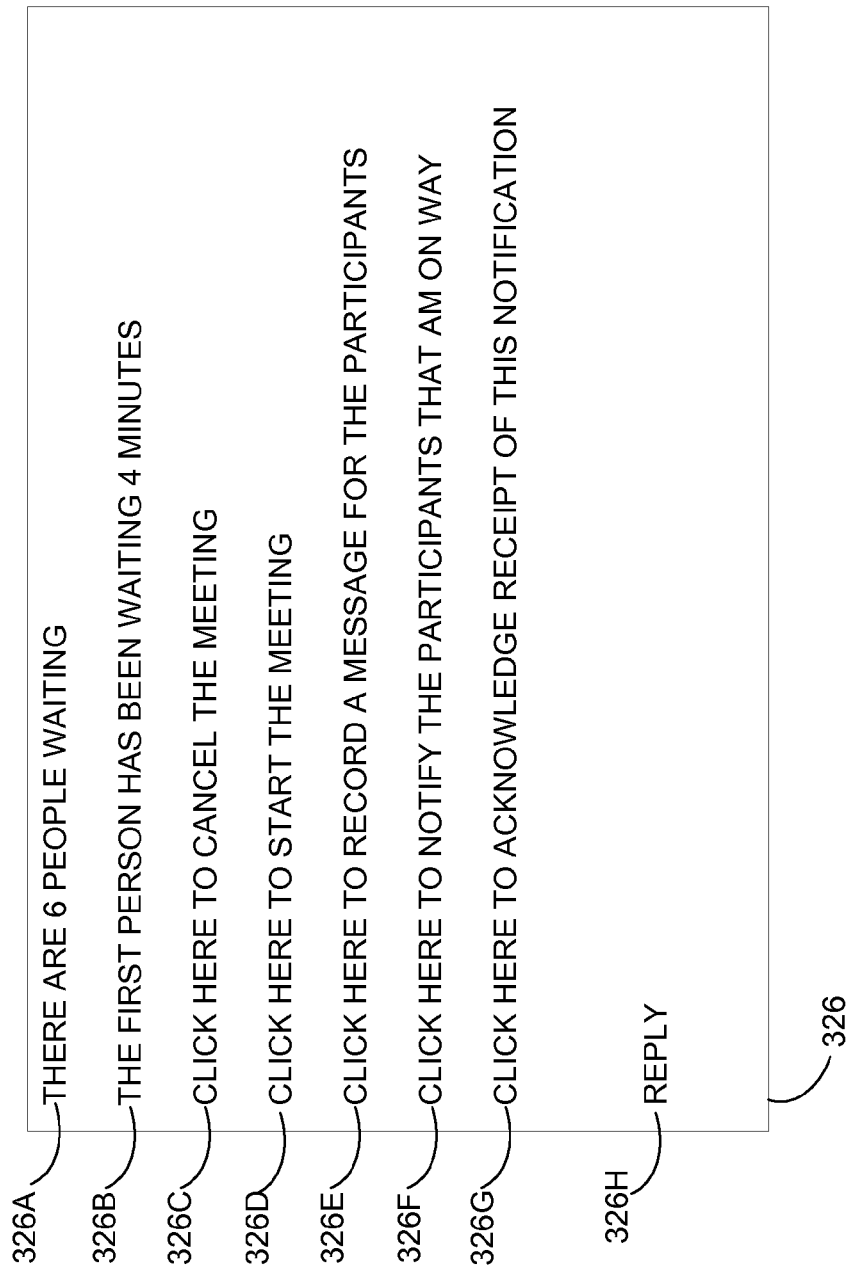
FIG. 3B depicts various items that might be included in a chairperson notification according to one embodiment of our technology.

At a step 324, a notification 326 is sent from teleconference server 314 to chairperson 316, thereby indicating the presence of the one or more participants that are waiting. Turning briefly to FIG. 3B, an illustrative example of such a notification 326 is provided. The notification 326 may take on a variety of forms and can include one or more of the items that we are about to describe. By way of example, an illustrative item is an indication 326A that indicates a number of people that are waiting. In the example shown, six people are waiting.

Another data item that might be included is referenced by numeral 326B, which indicates an amount of time that a given participant has been waiting. In some embodiments, this can be an amount of time that the longest person has been waiting. In other embodiments, the indication indicates how long each participant has been waiting. And in still other embodiments, wait times of selected participants can be provided.

Another piece of information that can be included as referenced by numeral 326C, which provides an actionable link to cancel the meeting. For example, chairperson 316 might receive an e-mail that includes option 326C. By acting on cancellation option 326C, teleconference server 314 will process a request by the chairperson to cancel the meeting. It will also notify all of the participants who are then waiting.

An option similar to 326C is that of 326D, which provides an option to remotely start the meeting and can even be done without the chairperson opening the bridge. For example, a chairperson might receive a mobile message that indicates the presence of one or more participants. If the chairperson has forgotten about a call or otherwise desires that the call start immediately, then he or she can act on option 326D to have the meeting started immediately. In such a case, teleconference server 314 will receive the request and open the bridge so that at least the participants can conduct the conference call. In such an embodiment, teleconference server 314 can store the announcements or other identifiers that identify the participants and provide those to the chairperson so that the chairperson can know who attended the call.

Another option is that referenced by numeral 326E, which indicates an actionable link to record a message that is to be communicated to the participants. By way of example, chairperson 316 might receive notification 326 by way of a Smartphone. Acting on item 326E would enable the Smartphone to receive a recording or text message from the chairperson. The recording might say something like, "I am on my way. Please open the slide deck to slide 7." This notification could be communicated by teleconference server 314 to the call-in devices in its native form (such as audio) or translated into form; for example, from audio to text or vice versa, whichever is most appropriate for a given call set-up, set of participants, or set of devices 312. The users would then receive this message and be able to act on it so that when chairperson 316 does arrive, at least some of the wait time could have been put to productive use.

Still another illustrative option that might be included in notification 326 includes an option 326F that is usable to notify the participants that chairperson 316 is on his or her way. Perhaps the chairperson is in a meeting that does not lend itself to recording a message or fidgeting with a mobile device. For example, chairperson 316 could merely press a hyperlink associated with option 326F, whereby teleconference server 314 would convey to the participants that the chairperson 316 has indicated that he or she is en route to the call.

Another option might be an option to acknowledge receipt of notification 326. This option is indicated by reference numeral 326G. Here, the chairperson can act on a link or other control to indicate that he or she has received notification 326. Again, even this receipt can be communicated by teleconference server 314 to the participants 312. Still further, teleconference server 314, though not shown, could communicate to participants 312 the fact that notification 326 itself has been sent to chairperson 316. Even this provides some feedback and level of information to awaiting participants so that they know that steps are being taken to get the conference call started.

A final illustrative item that might be included in notification 326 includes a reply option 326H, which conveys the notion that chairperson 316 can reply to notification 326 and the substance of that reply will be communicated to awaiting participants.

Returning now to FIG. 3A, a response 328 is communicated from chairperson 316 to teleconference server 314 at step 330. We have previously described various forms that response 328 might assume. Any type of response that is sent from chairperson 316 could be received by teleconference server 314. When teleconference server 314 receives response 328, it acts in accordance with the same. That is, if the response indicates that information should be communicated to the awaiting participants 312, then such information is communicated. If response 328 indicates that the conference call should be cancelled or started, then teleconference server 324 notifies the participants or opens the call respectively. These steps are indicated by reference numeral 332, which can also indicate action taken in response to a threshold event occurring.

For example, perhaps a certain amount of time passes or more callers join. This can trigger additional information being sent to chairperson 316 or even received from call-in devices 312.

As indicated, at a step 334, an update 336 is communicated to the awaiting participants 312. In one embodiment, this update is sent in direct response to teleconference server 314 receiving response 328. Update 336 is consistent with response 328. In other embodiments, the update 336 is more indirect. For example, if teleconference server 314 takes its own steps to reach chairperson 316 (for example, continuing to process contact information and rules 232), then additional updates 336 are sent to participants. Finally, as mentioned, thresholding events might also spur update 336 to be sent.

In the case where teleconference server 314 is to make additional attempts to contact chairperson 316, this happens at a step 338, in which more aggressive attempts 340 are made in connection with trying to notify chairperson 316 that participants are waiting for the conference call to begin. If a chairperson had indicated in his or her profile 232 and after a certain amount of time a default action is to be taken, then that default action could be taken (for example, by way of step 346). Otherwise, teleconference server 314 will continue to act consistent with either the information stored in chairperson profile 232 or based on an interactive session with the participants 312.

For example, teleconference server 314 might present an option to participants 312 to have the chairperson attempted to be reached again. Though not shown, this would include receiving such an indication at teleconference server 314, which could then act to attempt to contact chairperson 316. If teleconference server 314 is relying on the information stored in profile 232, then whatever steps the chairperson has indicated could be carried out, or information to be communicated consistent therewith, is either carried out or acted on accordingly. For example, if the chairperson stated that he or she should initially be contacted via e-mail, then after one minute a certain phone number, then after three minutes paged via a certain number, then after five minutes a broadcast blast is to be sent to a microblogging utility and a social-networking site as well as the previous measures, then teleconference server 314 will carry out the same.

A step 342 indicates the case where chairperson 316 provides a supplemental response 344. For example, if in attempting to contact chairperson more aggressively, teleconference server 314 had sent an e-mail to a high-priority e-mail address and then received a response, that response would be communicated at a step 346 to participants 312. Thus, an additional update 348 is sent to participants 312.

Turning now to FIG. 4, an illustrative method for initiating a conference call is provided and referenced generally by the numeral 410. At a step 412, an arrival indication is received that indicates that at least a first person is attempting to participate in a given conference call. The conference call is associated with a chairperson who is responsible for starting the conference call. The chairperson could be associated with a set of contact information such as an e-mail address, short-messaging-system identifier, a telephone number, any alias associated with the messaging program, etc.

At a step 414, a determination is made that the chairperson has not yet started the conference call. In one embodiment, determining that the chairperson has not yet arrived includes determining that a chairperson identifier has not yet been provided, in the case where a chairperson identifier is associated with the chairperson and is used to start the conference call. A chairperson identifier might take the form of a stream of numerical digits or some other stream that is usable to indicate or identify the chairperson.

If that code has not yet been entered, then teleconference server 314 will assume that the chairperson has not yet arrived. As mentioned, the chairperson identifier could indicate a leader code associated with the chairperson but could also take the form of device-identification information that indicates that a call is being made from a given device that is associated with the chairperson, or log-in credentials that are associated with the chairperson. Thus, if a chairperson remotes in from a computer with a certain IP address or phones in via a telephone that is associated with a certain telephone number, then teleconference server 314 can be configured to reference such information against information stored in profile such as profile 232 to determine whether the chairperson has arrived.

At a step 416, a notification is automatically sent to the chairperson. In one embodiment, the notification indicates that at least one caller is waiting for the conference call to begin. As mentioned, this sending of a notification could take the form of sending an e-mail to an e-mail address, calling a given telephone number, sending a message to an alias that is associated with a messaging program or even a social-networking application. Illustrative examples of a messaging program include an instant-messaging program, an SMS message, a recorded voice message, a social-networking application, a blogging application, a microblogging application, or a paging platform. A notification might include several options and the information in it. For example, it might include a link to start the conference call or a link that indicates that the notification has been received.

One embodiment of our technology contemplates receiving an acknowledgment indication that the notification has been received by the chairperson. Thus, teleconference server 314 is aware of the notification that it sent and might even be aware of whether the notification was successfully received by the chairperson. One or both of these bits of information can be communicated to the participant at step 418.

Figure 5:
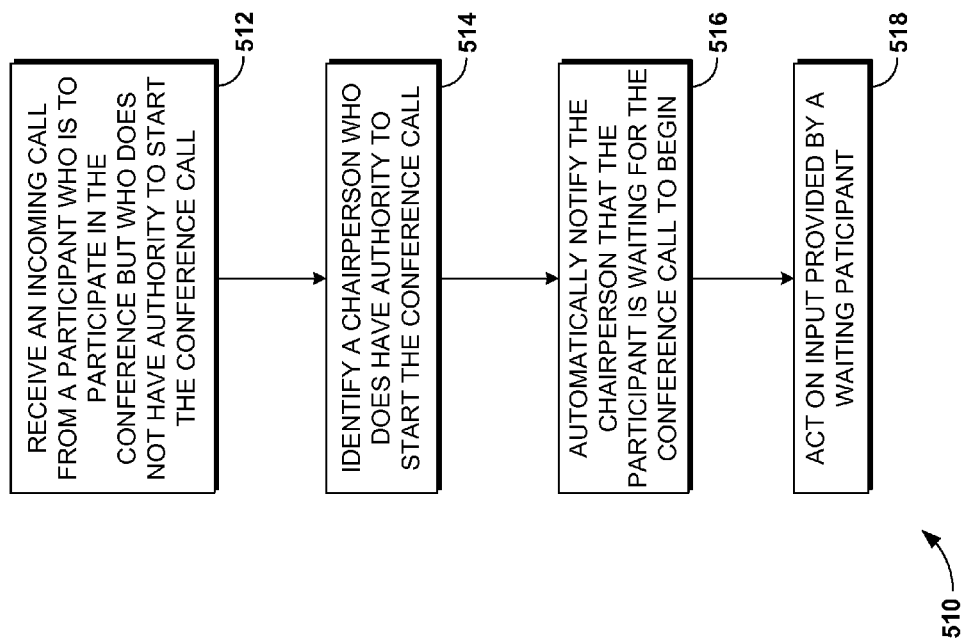

Turning now to FIG. 5, another illustrative method of increasing the likelihood that a conference call will occur is provided and referenced generally by the numeral 510. At a step 512, an incoming call is received from a participant who is to participate in the conference but who does not have authority to start the conference call. This would be the case of what is often referred to as a "participant." Generally, participants do not have the authority to start a call. At a step 514, a chairperson is identified who does have authority to start the conference call.

At a step 516, the chairperson is automatically notified that at least the one (and any other) participants are waiting for the conference call to begin. In one embodiment, the telecommunication server records announcements from each participant who is to join the conference call and then relays this information privately to the chairperson just before the chairperson joins the call (or also at a later time). Based on information received from the chairperson, the teleconference server acts consistently therewith to update the awaiting participant at step 518.

Figure 6:
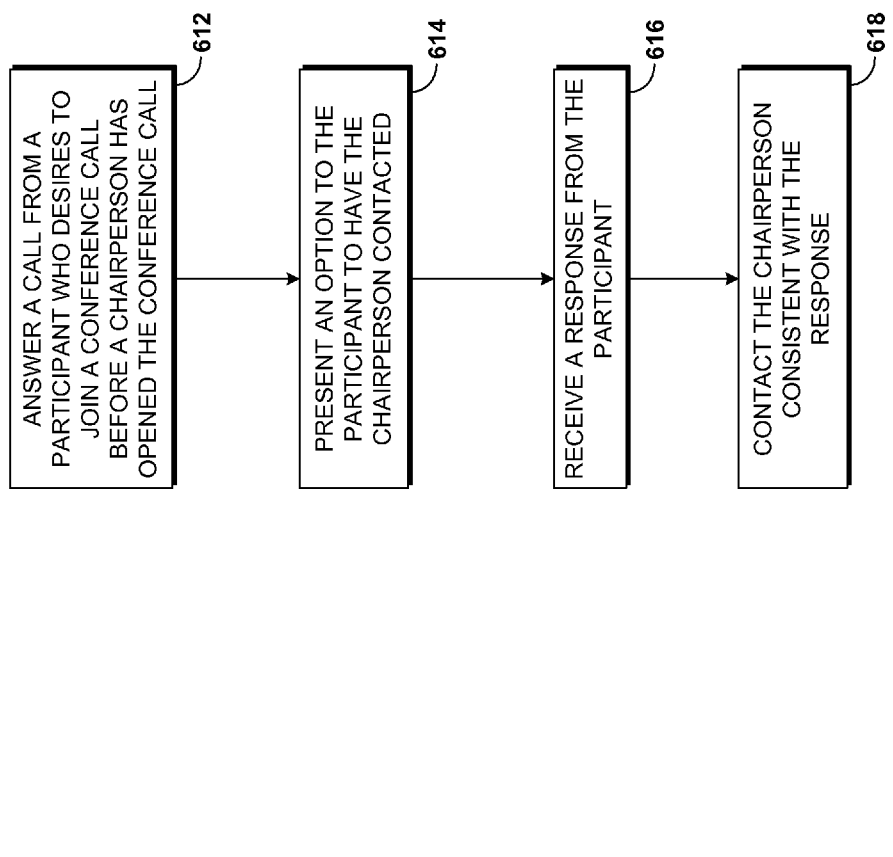

Turning now to FIG. 6, a final illustrative method of starting a conference call is provided and referenced generally by the numeral 610. At a step 612, a call is answered from a participant who desires to join a conference call before a chairperson has opened the conference call. At a step 614, an option is presented to the participant to have the chairperson contacted. It may not be the case that the participant desires for the chairperson to be contacted immediately. For example, perhaps the participants has phoned in early. If this is the case, although such could be handled automatically by way of programming the teleconference server, these options can also be pushed to the user to allow the user to decide what course of action should be taken. For example, perhaps the user is presented with a greeting along the lines of, "press 3 to have the chairperson contacted." In one embodiment, if a user never selects option 3, then the chairperson is never contacted. Perhaps the participant is multi-tasking and are content with the meeting not starting on time. In other embodiments, a user might act on the prompt, which will initiate a contacting process that attempts to contact the chairperson. Thus, if a response is received at a step 616, then it is acted on consistently therewith at a step 618.

Other aspects of our technology include an ability to record the identification or otherwise note the identification of the participants calling in, if such identification is possible, and then using this information to regulate conference calls. For example, if a first conference call is running over and taking longer than anticipated, then when someone else calls in with overlapping contact information and attempts to join in what it thinks is a different conference call, then the teleconference server can announce that the prior conference call has not ended and to stay on the line. Then, the various types of action items that we have previously discussed can occur.

For example, the chairperson can be notified that there are now participants awaiting to join a different conference call, even if the chairperson is actually on a first conference call. This is a way to help prevent unauthorized persons from joining a given conference call. Some ways of informing the teleconference server of the identity of participants calling in is to use an identification code, caller ID, or log-in credentials as more historically phone-type operations are taking place by way of computers. In this way, the teleconference server will have visibility into the identity of participants, and then can regulate who should join what calls and which participants are to receive what messages.

Certain messages can be sent to certain people in one embodiment. When someone attempts to dial into the conference bridge, the conference bridge system will check what chairperson the meeting belongs to. If the prior meeting is not finished, then as explained the participant will remain on hold instead of automatically being permitted to join the call. When the call is over, the second call will automatically start and the person on hold will automatically join.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more nontransitory computer-readable media having computer-executable instructions embodied thereon that, when executed, facilitate a method of initiating a conference call, the method comprising:
   receiving an arrival indication that indicates that a first person is attempting to participate in a conference call, wherein the conference call is associated with a chairperson who is responsible for starting the conference call;
   determining that the chairperson has not yet started the conference call; and
   automatically sending a notification to the chairperson, wherein the notification indicates that at least one caller is waiting for the conference call to begin;
   receiving an indication from a subsequent participant, one associated with a different conference call;

preventing said subsequent participant from joining said conference call until it has completed; and automatically permitting said subsequent participant to join said different conference call after said conference call has ended.

2. The media of claim 1, wherein the chairperson is associated with a set of contact information, which includes one or more of the following:

an email address;
a short-message-service (SMS) identifier;
a first telephone number; or
an alias associated with a messaging program.

3. The media of claim 2, wherein the determining that the chairperson has not yet arrived includes determining that a chairperson identifier has not yet been provided, wherein the chairperson identifier is associated with the chairperson and is used to start the conference call.

4. The media of claim 3, wherein the chairperson identifier includes one or more of the following:

a leader code associated with the chairperson;
device-identification information that indicates that a call is being made from a given device associated with the chairperson; or
log-in credentials that are associated with the chairperson.

5. The media of claim 4, wherein automatically sending the notification to the chairperson includes utilizing the contact information to send the notification to the chairperson, and wherein utilizing the contact info includes one or more of the following:

sending an email to the email address;
calling the first telephone number; or
sending a message to the alias, wherein the message is presentable via the messaging program.

6. The media of claim 5, wherein the messaging program includes one or more of the following:

an instant-messaging program;
an SMS-messaging program;
a recorded-voice-message interpreting program;
a social-networking application;
a blogging application;
a microblogging application; or
a paging platform.

7. The media of claim 5, wherein the notification includes one or more of the following:

a link to start the conference call; or
a link that indicates that the notification has been received.

8. The media of claim 7, further comprising receiving an acknowledgement indication that the notification has been received by the chairperson.

9. The media of claim 8, further comprising communicating to any waiting callers that the chairperson has received the notification.

10. The media of claim 7, further comprising receiving an indication to start the conference call.

11. The media of claim 10, further comprising starting the conference call.

12. The media of claim 1, wherein the automatically sending the notification to the chairperson occurs after a threshold event occurs, and wherein the threshold event includes one or more of the following:

after a certain number of people are waiting for the conference call to begin; or
after a person has waited a certain amount of time.

13. One or more nontransitory computer-readable media having computer-executable instructions embodied thereon that, when executed, facilitate a method of increasing the likelihood that a conference call will occur, the method comprising:

receiving an incoming call from a participant who is to participate in the conference call but who does not have authority to start the conference call;
identifying a chairperson who does have authority to start the conference call; and
automatically notifying the chairperson that the participant is waiting for the conference call to begin;
receiving an indication from a subsequent participant, one associated with a different conference call;
preventing said subsequent participant from joining said conference call until it has completed; and
automatically permitting said subsequent participant to join said different conference call after said conference call has ended.

14. The media of claim 13, wherein the automatically notifying includes communicating a notification to the chairperson, and
wherein communicating the notification includes referencing a set of contact information associated with the chairperson, and communicating the notification consistent with the contact information.

15. The media of claim 14, wherein the notification includes one or more of the following:

an indication of a number of people who are waiting;
an indication of an amount of time that one or more people have been waiting;
a cancellation option;
a start option;
an option to have a custom message communicated to waiting persons; or
an acknowledgement option.

16. The media of claim 14, further comprising providing to one or more waiting participants an update based on the receiving a response to the notification.

17. The media of claim 16, further comprising recording an announcement from each participant who is to join the conference call;
starting the conference call based on feedback from the chairperson; and
communicating to only the chairperson the announcements prior to the chairperson joining the conference call.

18. One or more nontransitory computer-readable media having computer-executable instructions embodied thereon that, when executed, facilitate a method of starting a first conference call, the method comprising:

answering a call from a participant who desires to join the first conference call before a chairperson has opened the conference call;
presenting an option to the participant to have the chairperson contacted;
receiving a response from the participant;
contacting the chairperson consistent with the response;
receiving an indication from a subsequent participant, one associated with a different conference call;
preventing said subsequent participant from joining said first conference call until it has completed; and
automatically permitting said subsequent participant to join said different conference call after the first conference call has ended.

19. The media of claim 18, wherein the option includes one or more of the following:

to contact the chairperson in a prescribed manner;

to record a custom message that is to be sent to the chairperson; or to wait a threshold amount of time until contacting the chairperson.

\* \* \* \* \*